United States Patent
Nakasone et al.

(12) United States Patent (10) Patent No.: US 7,643,681 B2
(45) Date of Patent: Jan. 5, 2010

(54) COLOR CORRECTION INVOLVING COLOR PHASE DETECTION AND PHASE-DEPENDENT CONTROL

(75) Inventors: Youichi Nakasone, Tsukuba (JP); Toshihiro Sasai, Kyoto (JP)

(73) Assignee: Media Tek USA Inc, San Jose, CA (US)

( * ) Notice: Subject to any disclaimer, the term of this patent is extended or adjusted under 35 U.S.C. 154(b) by 749 days.

(21) Appl. No.: 11/326,252

(22) Filed: Jan. 5, 2006

(65) Prior Publication Data

US 2007/0153019 A1 Jul. 5, 2007

(51) Int. Cl.
*G06K 9/00* (2006.01)
*G06K 9/40* (2006.01)

(52) U.S. Cl. .................. 382/167; 382/274; 345/600; 348/441; 348/662; 348/663

(58) Field of Classification Search .............. 382/167, 382/274; 348/441–459, 662, 663; 345/600–604
See application file for complete search history.

(56) References Cited

U.S. PATENT DOCUMENTS

| | | | | |
|---|---|---|---|---|
| 5,247,350 A | | 9/1993 | Meyer et al. ............... 348/189 |
| 5,416,599 A | * | 5/1995 | Ubukata et al. ............ 386/13 |
| 6,400,371 B1 | | 6/2002 | Helman et al. ............. 345/589 |
| 6,552,751 B1 | * | 4/2003 | Shigeta ..................... 348/659 |
| 2003/0001952 A1 | | 1/2003 | Iida et al. .................. 348/69 |
| 2003/0002736 A1 | | 1/2003 | Maruoka et al. ............ 382/168 |
| 2003/0107679 A1 | * | 6/2003 | Kim ........................ 348/651 |
| 2003/0133609 A1 | * | 7/2003 | Ubillos et al. .............. 382/167 |
| 2006/0077276 A1 | * | 4/2006 | Noguchi ................... 348/312 |
| 2007/0133902 A1 | * | 6/2007 | Kumar ..................... 382/298 |

OTHER PUBLICATIONS

International Search Report and Written Opinion of International Searching Authority for PCT/US07/00293 dated Apr. 24, 2008 (10 pages).

* cited by examiner

*Primary Examiner*—Aaron W Carter
(74) *Attorney, Agent, or Firm*—Imperium Patent Work

(57) ABSTRACT

Color correction is performed on a first set of three pixel values by determining a color phase of the pixel values. The determined color phase is used to determine a phase difference, and the phase difference is used to control an amount of color phase rotation applied to the chrominance pixel values of the first set. The color phase is also used to determine a first gain, and the first gain is used to control a scaling of the rotated chrominance pixel values, thereby generating color corrected chrominance pixel values. The color phase is also used to determine a second gain, and the second gain is used to control an amount of scaling applied to the luminance pixel value of the first set, thereby generating the color corrected luminance pixel value. How color phase determines phase difference, the first gain and the second gain is changed depending on lighting conditions.

18 Claims, 6 Drawing Sheets

CONVERTED PIXEL VALUES  FIRST CONVERSION MATRIX  UNCONVERTED PIXEL VALUES $$\begin{bmatrix} R' \\ G' \\ B' \end{bmatrix} = \begin{bmatrix} A00 & A01 & A02 \\ A10 & A11 & A12 \\ A20 & A21 & A22 \end{bmatrix} \begin{bmatrix} R \\ G \\ B \end{bmatrix}$$

FIG. 1

CONVERTED PIXEL VALUES  DETECTED PURE RED $$\begin{bmatrix} 200 \\ 0 \\ 0 \end{bmatrix} = \begin{bmatrix} 3.0 & -1.0 & -1.0 \\ -1.0 & 3.0 & -1.0 \\ -1.0 & -1.0 & 3.0 \end{bmatrix} \begin{bmatrix} 100 \\ 50 \\ 50 \end{bmatrix}$$

M(100,0,100) ←#1— M(75,50,75) ← MAGENTA (DETECTED BALANCED)
M(105,5,85) ←#1— M(75,50,70) ← MAGENTA (DETECTED UNBALANCED)

FIG. 4

CONVERTED PIXEL VALUES  SECOND CONVERSION MATRIX  MAGENTA (DETECTED UNBALANCED)

$$\begin{bmatrix} 100 \\ 0 \\ 100 \end{bmatrix} = \begin{bmatrix} 2.0 & -1.0 & 0 \\ -2.0 & 3.0 & 0 \\ 0 & -1.5 & 2.5 \end{bmatrix} \begin{bmatrix} 75 \\ 50 \\ 70 \end{bmatrix}$$

FIG. 5

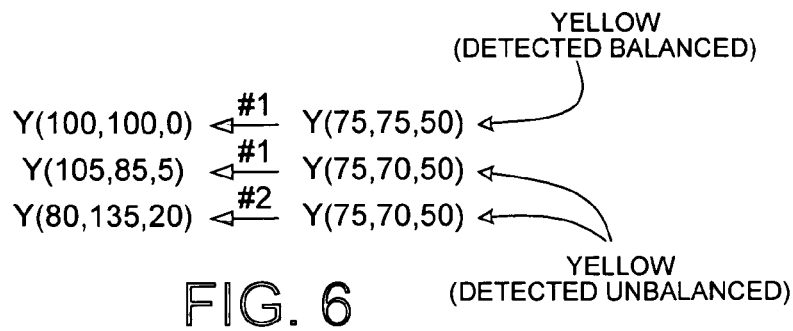
FIG. 6
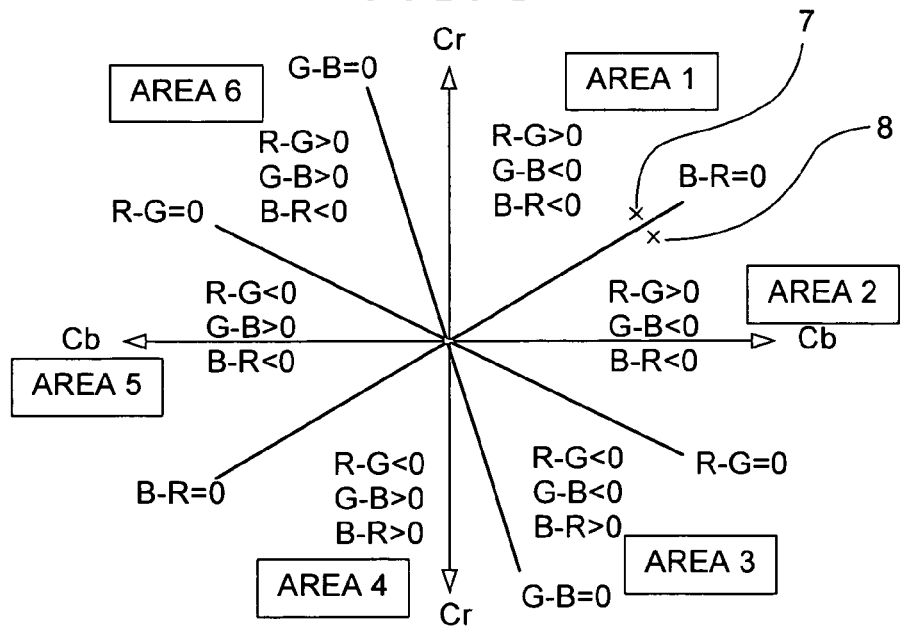
FIG. 7
(200,0,0)  ←——— (100,50,50)
(0,200,0)  ←——— (50,100,50)
(50,50,100) ←——— (50,50,100)
THESE CONVERSIONS ARE NOT POSSIBLE WITH MATRICES #1, #2, #3
FIG. 8
CbCr COLOR SPACE IS DIVIDED INTO SIX AREAS - USE DIFFERENT MATRIX FOR EACH AREA
FIG. 9

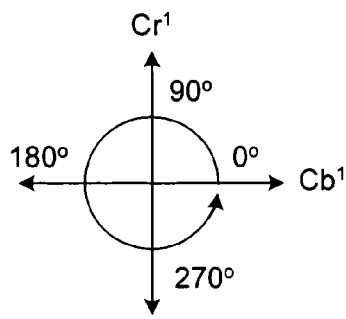
PHASE ANGLE
FIG. 11
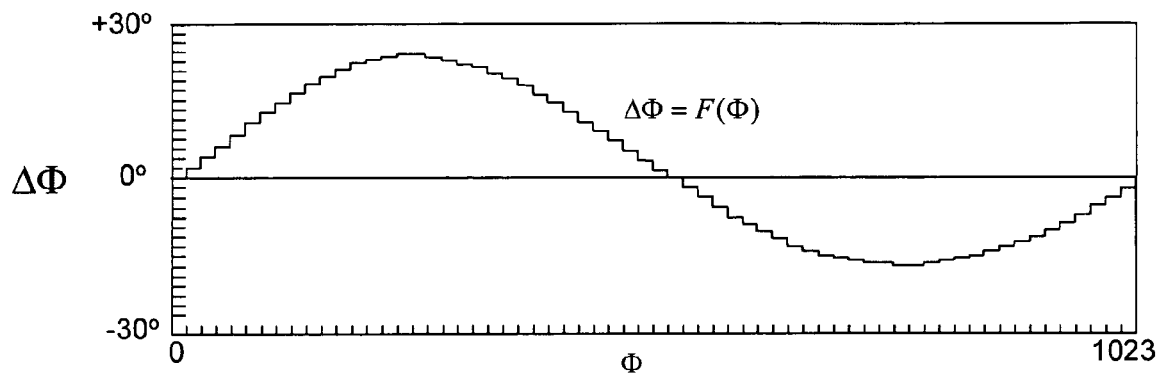
FIG. 12
$$Cb^I = Cb^1 * \cos(\Delta\Phi) - Cr^1 * \sin(\Delta\Phi)$$
$$Cr^I = Cb^1 * \sin(\Delta\Phi) + Cr^1 * \cos(\Delta\Phi)$$
FIG. 13

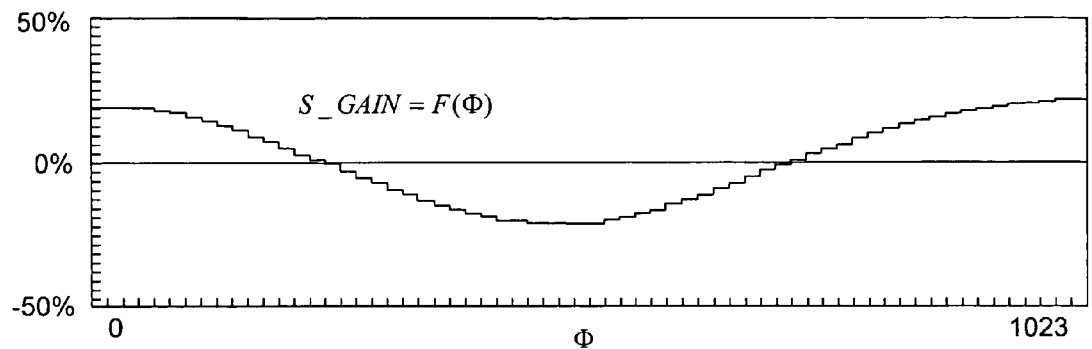
FIG. 14
$$Cb^2 = Cb^1 * (1 + S\_GAIN)$$
$$Cr^2 = Cr^1(1 + S\_GAIN)$$
FIG. 15
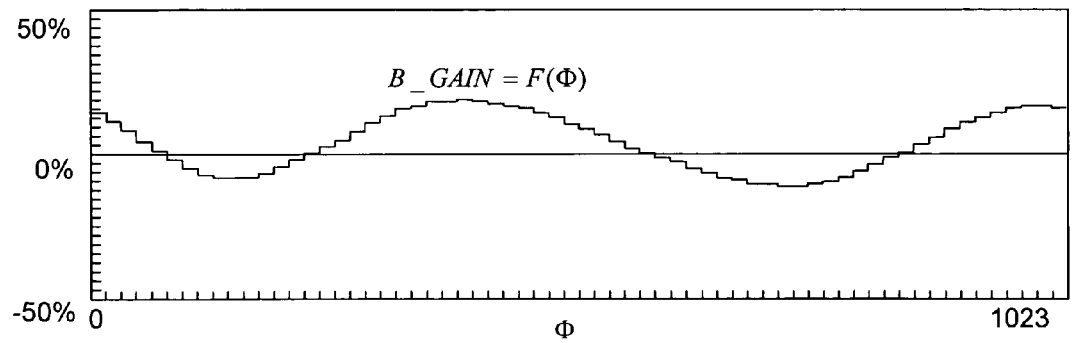
FIG. 16
$$Y^2 = Y^1 * (1 + B\_GAIN)$$
FIG. 17

COLOR CORRECTION INVOLVING COLOR PHASE DETECTION AND PHASE-DEPENDENT CONTROL

TECHNICAL FIELD

The present invention relates to color correction.

BACKGROUND

In a typical digital image capture device (for example, a digital camera or cellular telephone having digital camera functionality), an image sensor captures an image as a matrix of pixel values. The image sensor (for example, a CCD image sensor or a CMOS image sensor) may output the values as digital values or may communicate information to another integrated circuit (sometimes called an Analog Front End/Timing Generator or "AFE/TG") that in turn outputs digital values. The digital values are often in Bayer format. The Bayer format values are often converted into a set of three tristimulus values (such as a set of three RGB pixel values). For each pixel, there is one such R (red) pixel value, one such G (green) pixel value, and one such B (blue) pixel value.

The image sensor typically uses a different color filter for each color detected. For example, a first color filter is disposed over a sensor for red, a second color filter is disposed over a sensor for green, and a third color filter is disposed over a sensor for blue. The operation of the image sensor and color filters is such if light of a pure red color is incident on the image sensor, then the image sensor outputs RGB pixel values that involve not only a red pixel value, but also involve a non-zero green pixel value and/or non-zero blue pixel value. The RGB pixel values output by the image sensor are therefore not pixel values for pure red even though pure red light was incident on the image sensor. The presence of other color components is said to be a "color error." Similarly, if light of a pure green color is incident upon the image sensor, then the image sensor may output RGB pixel values that involve not only a green pixel value, but also involve a non-zero red pixel value and/or a non-zero blue pixel value.

So called "color correction" is therefore performed on each set of RGB values as output from the image sensor in order to convert the RGB sensor output values into "corrected" RGB values. FIG. 1 (Prior Art) is a diagram that illustrates a set of three unconverted RGB pixels values in a column vector at the right. The "R" represents a red pixel value. The "G" represents a green pixel value. The "B" represents a blue pixel value. The column vector is multiplied by first 3×3 conversion matrix using matrix mathematics to generate a corresponding set of three converted R'G'B' pixel values in a column vector at the left. The "R'", "G'" and "B'" represent the red, green and blue pixel values as converted (i.e., corrected).

FIG. 2 (Prior Art) illustrates an example where pure red light is detected as a set of three RGB pixel values of (100, 50,50). The "100" in this notation indicates an intensity of red. The next "50" indicates an intensity of green. The last "50" indicates an intensity of blue. Note that there is significant color error in that there are significant components of green and blue in addition to red. The first 3×3 matrix is applied such that a set of three R'G'B' pixel values of (200, 0, 0) is output. Note that the correction works properly in that there is no green or blue component in the resulting converted pixel values (200, 0, 0).

FIG. 3 (Prior Art) illustrates how three different sets of RGB pixels values are converted using the first matrix. The "#1" above the arrow represents use of the first matrix. The uppermost conversion is the conversion illustrated above in FIG. 2 for a condition where pure red light is incident upon the image sensor. The next lower conversion is a conversion for a condition where pure green light in incident upon the image sensor. The resulting pixel values (0, 200, 0) is corrected in that they involve no red component or blue component. The bottom-most conversion is a conversion for a condition where pure blue light is incident upon the sensor. The resulting pixel values (0, 0, 200) is corrected in the that the values involve no red or green component.

FIG. 4 (Prior Art) illustrates two transformations. The upper transformation illustrates the transformation of pixel values (75, 50, 75) output by the image sensor when pure magenta light is incident upon the image sensor. The red pixel value and the blue pixel value are both 75. The value is therefore said to be "balanced". When the first matrix is applied, the result (100, 0, 100) properly involves equal intensities of the red and blue components, and no component of green. A typical image sensor may, however, not necessarily output balanced pixel values if pure magenta light is incident upon the image sensor. The image sensor may, for example, output an unbalanced value of (75, 50, 70). The red and blue components in the unbalanced value are not identical.

The lower transformation illustrated in FIG. 4 illustrates the result (105, 5, 85) when the first matrix is applied in an attempt to color-correct the unbalanced (75, 50, 70) pixel values. The (105, 5, 85) result is incorrect in that the intensities of red and blue differ, and also in that there is a non-zero amount of green.

FIG. 5 illustrates a second matrix. The unbalanced (75, 50, 70) pixel values are multiplied by the second matrix to output a "corrected" value (100, 0, 100). The result is correct in that the red and blue components are equal, and there is no green component.

To perform a color correction operation on an image having many sets of RGB pixel values, each set of three RGB pixel values is treated separately. If the RGB pixel value is one of the sensor output values that would have resulted were pure red, pure green, or pure blue to have been incident on the image sensor as indicated in FIG. 3, then the first matrix is applied to perform color correction on the RGB pixel values. If, on the other hand, the set of RGB pixel values is the set of unbalanced sensor output values that would have resulted if magenta were incident upon the image sensor as indicated in the bottom example of FIG. 4, then the second matrix is applied. A decision is therefore made, on a pixel-by-pixel basis, as to which matrix is to be used to perform the color correction.

FIG. 6 illustrates three additional transformations. The upper transformation illustrates a transformation of balanced RGB pixel values (75, 75, 50) that would be output from the image sensor if pure yellow light were incident upon the image sensor. The RGB pixel values are "balanced" because the intensities of red and green are identical. If the first matrix is applied, then a proper RGB value of (100, 100, 0) is output as indicated by the uppermost transformation. Again, an image sensor may not output a balanced value when pure yellow is incident upon it. The image sensor may, for example, output an RGB value of (75, 70, 50). As the second transformation of FIG. 6 illustrates, applying the first matrix to such an unbalanced value results in incorrect RGB values (105, 85, 5). The red and blue components are not equal, and there is a small amount of blue. As the third transformation of FIG. 6 illustrates, applying the second matrix also does not result in correct RGB values. The output is (80, 135, 20). The red and green components are not equal, and there is an amount of blue.

FIG. 7 (Prior Art) illustrates a third matrix that properly converts the unbalanced yellow sensor pixel values (75, 70, 50) of FIG. 6 into a converted RGB pixel values (100, 100, 0). The red and green components are equal, and there is no blue component. Accordingly, for each set of RGB pixel values, a determination is made as to which one of the three matrices (matrix 1, matrix 2, or matrix 3) will be used. Using the three matrices of these examples, however, it is not possible to perform several transformations that might be necessary to perform accurate color correction. FIG. 8 (Prior Art) illustrates three such transformations that cannot be performed using the three exemplary matrices. A significant number of matrices therefore may be employed to perform adequately accurate color correction in a digital image capture device.

FIG. 9 (Prior Art) is a diagram that illustrates a use of six different matrices to perform so called "color correction" in one prior art digital camera. The two dimensional diagram illustrates the YCbCr color space. Each pixel involving a set of three RGB pixel values can be converted using a well known conversion matrix into another set of three YCbCr pixel values. The YCbCr pixel values are said to be in the YCbCr "color space" whereas the RGB pixel values are said to be in the "RGB" color space. Color and luminance information about a pixel can be represented by a set of three RGB pixel values and can also be represented by a set of three YCbCr pixel values. In the YCbCr format, the Y represents brightness (or luminance) of the pixel. The Cb and Cr values define the color (or chrominance) of the pixel. The two dimensional diagram of FIG. 9 therefore represents a graph of all possible chrominances that a pixel can have. The color space of the diagram is sectioned into six areas 1-6. The boundary between areas 1 and 2, for example, is defined by the blue and red pixel values of a pixel being identical (B−R=0). The boundary between areas 1 and 6, for example, is defined by the green and blue pixel values of a pixel being identical (G−B=0). Pixels falling within area 1 have values where R−G>0, G−B<0 and B−R<0. In this way, for a given set of RGB pixel values, a determination is made as to which area the RGB pixel value belongs. A different matrix is applied for each area. The color space sectioning of FIG. 9 is performed as a way to determine which one of six matrices should be applied to achieve the best color correction.

Consider a situation in which a first set of three uncorrected RGB pixel values is disposed at location 7 close to the boundary where B−R=0. B−R for the set of RGB pixels is positive, but only slightly so. The set of uncorrected RGB pixels is determined to be in area 1, so a first matrix is applied to perform color correction. Next, consider a situation in which a second set of three uncorrected RGB pixel values is disposed at location 8 close to the boundary where B−R=0. B−R for the set of RGB pixels is negative, but only slightly so. The set of uncorrected RGB pixels is determined to be in area 2, so a second matrix is applied to perform color correction. Even though there is only a slight difference between the values in the first and second sets of uncorrected RGB pixel values, entirely different matrices are applied to the two sets of pixel values. The result of the color correction operation using the scheme of FIG. 9 is an undesirable jump or disparity in the color corrected RGB output values when the uncorrected RGB input values only exhibit a slight change, one with respect to another. A solution is desired.

SUMMARY

Color correction is performed on a first set of three pixel values by determining a color phase of the pixel values. In one example, the first set of pixel values ($Y^1$, $Cb^1$, $Cr^1$) is in the YCbCr color space. The color phase is determined from the $Cb^1$ and $Cr^1$ chrominance values of the pixel. The determined color phase is then used to determine a phase difference. The phase difference is used to control an amount of color phase rotation applied to the chrominance pixel values of the first set. How the color phase determines the phase difference is a function, and this function is chosen to perform the correct amount of color rotation at each color phase.

The determined color phase is also used to determine a first gain. The first gain is used to control a scaling of the rotated chrominance pixel values, thereby generating color-corrected chrominance pixel values $Cb^2$ and $Cr^2$. How the color phase determines the first gain is a function, and this function is chosen to perform the correct amount of scaling at each color phase.

The determined color phase is also used to determine a second gain. The second gain is used to control an amount of scaling applied to the $Y^1$ luminance pixel value of the first set, thereby generating the color-corrected luminance pixel value $Y^2$. How color phase determines the second gain is chosen to perform the correct amount of scaling at each color phase. The color corrected pixel value generated is ($Y^2$, $Cb^2$, $Cr^2$).

In one embodiment, the functions that determine how the color phase determines the phase difference, how the color phase determines the first gain, and how the color phase determines the second gain are implemented in lookup table memories. An image capture device (for example, a digital camera or a cellular telephone having digital camera functionality) implements the color correction described above. The image capture device has a plurality of light condition settings. Different lookup table values are used depending on the lighting condition setting in which the image capture device is operating.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 (Prior Art) is a diagram that illustrates conventional color correction wherein a conversion matrix is used to convert a set of pixel values into a color-corrected set of pixel values.

FIG. 2 (Prior Art) illustrates an example where pure red light is detected as a set of three RGB pixel values of (100, 50, 50) and these pixel values are color corrected using the matrix of FIG. 1.

FIG. 3 (Prior Art) illustrates three examples of color correction using the matrix of FIG. 1.

FIG. 4 (Prior Art) illustrates two examples of how pixel values obtained by sensing pure magenta light on two different image sensors are converted using the matrix of FIG. 1.

FIG. 5 (Prior Art) illustrates a second matrix usable to color correct the unbalanced pixel values of FIG. 4.

FIG. 6 (Prior Art) illustrates three examples of how pixel values obtained by sensing pure yellow light on two different image sensors might be converted using the matrices of FIGS. 2 and 5.

FIG. 7 (Prior Art) illustrates how a third matrix can be used to color correct a set of unbalanced pixel values of FIG. 6.

FIG. 8 (Prior Art) illustrates three color correction conversions that cannot be performed using the three matrices of FIGS. 2, 5 and 7.

FIG. 9 (Prior Art) illustrates how a set of pixel values is color-corrected using a selected one of six different matrices.

The matrix selected to correct a set of pixel values depends on which one of six areas of the CbCr color space contains the set of pixel values.

Figure 10:
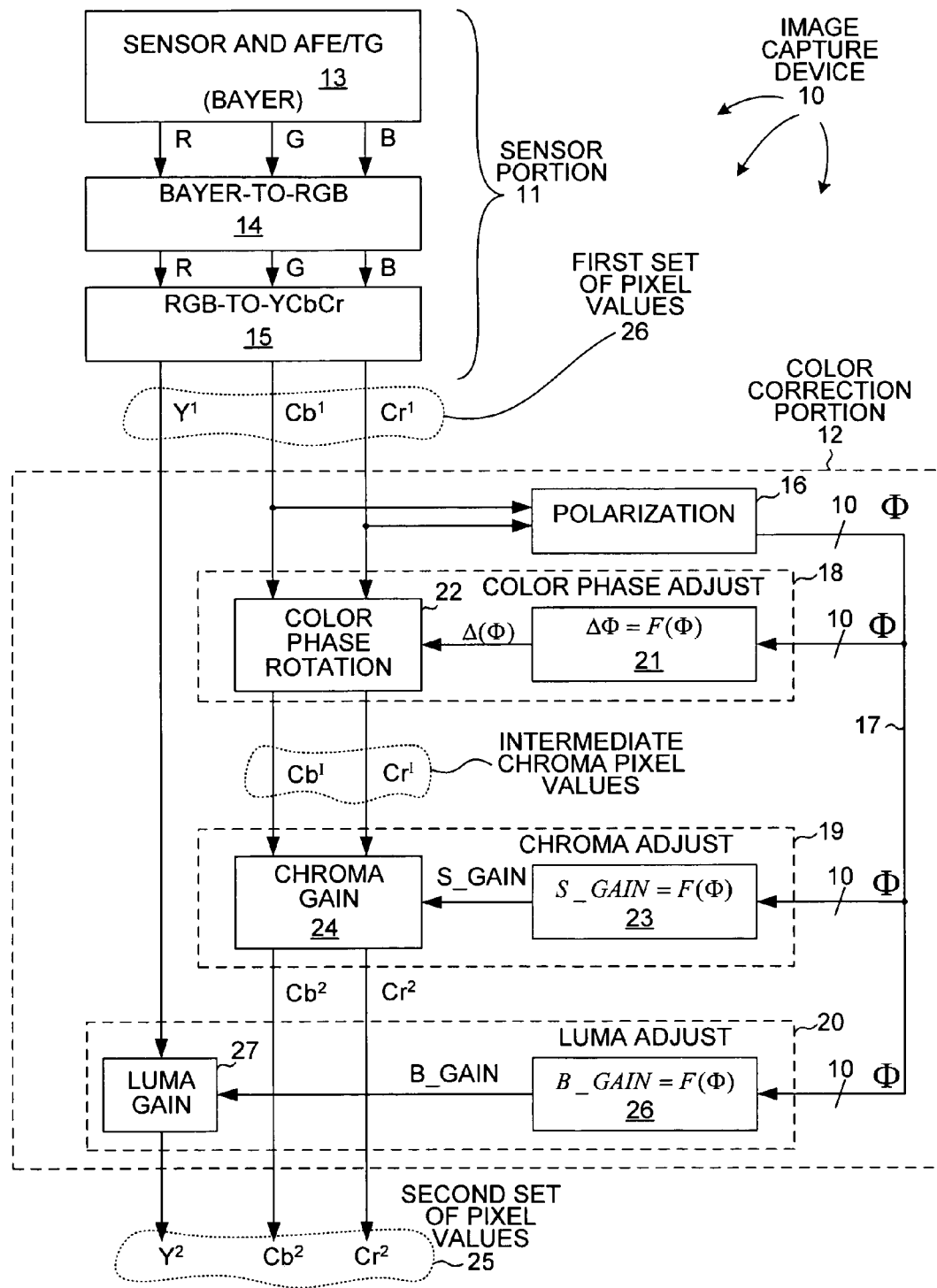

FIG. 10 is a simplified block diagram of a novel image capture device that performs a novel color correction method.

FIG. 11 is a diagram that illustrates how a phase angle is determined from the first $Cb^1$ and $Cr^1$ chrominance pixel values.

FIG. 12 illustrates a function for using a phase angle value to determine a phase difference value.

FIG. 13 illustrates how a phase difference value is usable to perform color rotation, thereby converting the first $Cb^1$ and $Cr^1$ chrominance values into intermediate $Cb^I$ and $Cr^I$ chrominance values.

FIG. 14 illustrates a function for using a phase angle value to determine a first gain value (S_GAIN).

FIG. 15 illustrates how a first gain value (S_GAIN) is usable to perform chrominance scaling (gain adjustment) on the intermediate chrominance values $Cb^I$ and $Cr^I$.

FIG. 16 illustrates a function for using a phase angle value to determine a second gain value (B_GAIN).

FIG. 17 illustrates how a second gain value (B_GAIN) is usable to perform luminance scaling (gain adjustment) on the first $Y^1$ luminance value, thereby generating a second luminance value $Y^2$. The pixel values $Y^2$, $Cb^2$ and $Cr^2$ are the color-corrected pixel values generated by the novel image capture device of FIG. 10.

Figure 18:
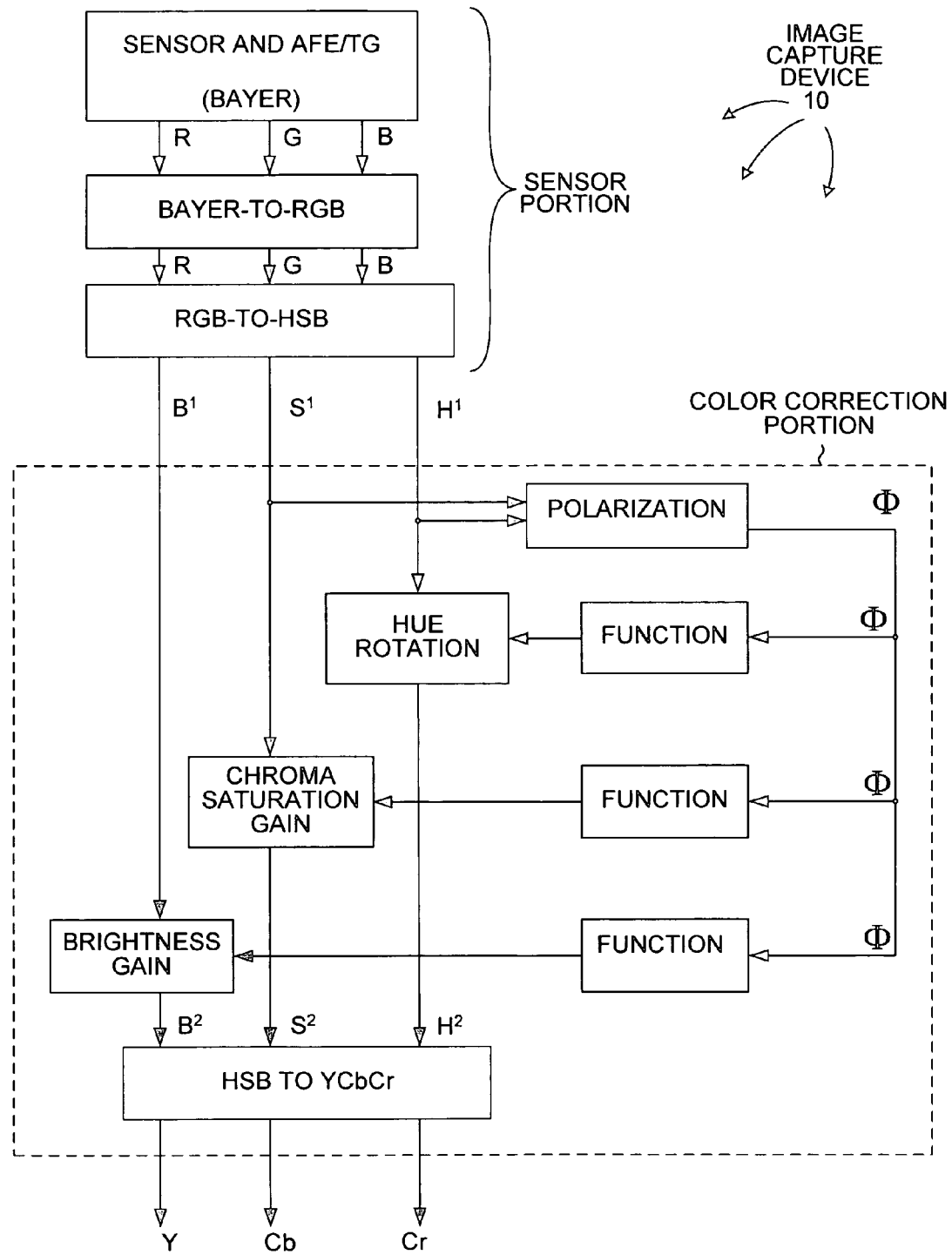

FIG. 18 is a diagram of another embodiment. Color correction in the embodiment of FIG. 18 is performed in the HSB (Hue, Saturation, Brightness) color space.

DETAILED DESCRIPTION

Reference will now be made in detail to some embodiments of the invention, examples of which are illustrated in the accompanying drawings.

FIG. 10 is a diagram of an image capture device 10 in accordance with one novel aspect. Image capture device 10 may, for example, be a digital camera or a mobile communication device that includes digital camera functionality. Image capture device 10 includes a sensor portion 11 and a color correction portion 12. Color correction portion 12 receives pixel information from the sensor portion and performs color correction on the pixel information by determining a color phase of the pixel information, and then by using the color phase to control a color phase rotation operation, a chrominance scaling operation, and a luminance scaling operation. In the illustrated example, sensor portion 11 includes an image sensor and analog front end/timing generator (AFE-TG) 13, a Bayer-to-RGB conversion circuit 14, and an RGB-to-YCbCr conversion circuit 15.

The image sensor and AFE/TG circuitry captures an image and outputs corresponding Bayer data. Bayer-to-RGB conversion circuit 14 converts the Bayer data into sets of tristimulus RGB pixel values. One set of RGB pixel values includes a red (R) pixel value, a green (G) pixel value, and a blue (B) pixel value. There is one such set of RGB pixel values for each pixel.

Operation of the image capture device 10 of FIG. 10 is described in connection with one such set of RGB pixel values being supplied to the RGB-to-YCbCr conversion circuit 15. The RGB-to-YCbCr conversion circuit 15 converts the set of RGB pixel values into a first set 26 of pixel values in the YCbCr color space. This first set 26 of pixel values involves a first $Y^1$ luminance value, a first $Cb^1$ chrominance value, and a first $Cr^1$ chrominance value. The first $Cb^1$ chrominance value and the first $Cr^1$ chrominance value are supplied to a polarization block 16. Polarization block 16 converts the first $Cb^1$ chrominance value and the first $Cr^1$ chrominance value into a corresponding phase angle phi ($\Phi$).

FIG. 11 is an illustration of the conversion operation performed by polarization block 16. The pair of first $Cb^1$ and $Cr^1$ chrominance values corresponds to a point in the X-Y plane illustrated in FIG. 11. The phase angle phi from the origin is the arctangent of $Cr^1/Cb^1$. The phase angle phi is represented as a ten bit number on parallel bus 17. Values in the range of from 0 to 1024 represent corresponding values in the range of from zero degrees to 360 degrees.

The phase angle phi is supplied in parallel to a color phase adjust circuit 18, a chrominance adjust circuit 19, and a luminance adjust circuit 20. A function block 21 within color phase adjust circuit 18 converts the phase angle phi into a corresponding phase difference value $\Delta(\Phi)$.

FIG. 12 is a diagram that illustrates the correspondence between the phase angle phi ($\Phi$) supplied to function block 21 and the phase difference value $\Delta(\Phi)$ output from function block 21. In the diagram of FIG. 12, the incoming phase angle phi ($\Phi$) is represented on the X-axis. The resulting phase difference $\Delta(\Phi)$ is represented on the Y-axis. Depending on the value of the incoming phase angle phi, the output phase difference value ranges between a high value of approximately +25 degrees and a low value of approximately −15 degrees. In the illustrated example, the function that converts the incoming phase angle phi ($\Phi$) into the phase difference value appears as a stepped sinusoidal function.

Returning to FIG. 10, the phase difference value $\Delta(\Phi)$ is supplied to a color phase rotation block 22 of the color phase adjust circuit 18. Color phase rotation block 22 performs a color phase rotation operation that is controlled by the phase difference value $\Delta(\Phi)$. Color phase rotation block 22 receives the first $Cb^1$ chrominance value and the first $Cr^1$ chrominance value and generates an intermediate $Cb^I$ chrominance value and an intermediate $Cr^I$ chrominance value.

FIG. 13 illustrates how an incoming first $Cb^1$ chrominance value is converted into an intermediate $Cb^I$ chrominance value depending on the magnitude of the phase difference value. Similarly, the diagram illustrates how an incoming first $Cr^1$ chrominance value is converted into an intermediate $Cr^I$ chrominance value depending on the magnitude of the phase difference value. The amount of color phase rotation at each phase angle phi can be preset by adjusting how the function of FIG. 12 converts the phase angle phi into the phase difference value. For example, if the function of FIG. 12 generates a phase difference value of zero for a particular phase angle phi, then there is no color phase rotation performed for the phase angle phi. As seen in FIG. 12, no color phase rotation is performed for phase angles $\Phi$ of 0 and 512.

As illustrated in FIG. 10, the phase angle phi $\Phi$ is also supplied to the chrominance adjust circuit 19. A gain determination block 23 receives the phase angle phi value and converts it into a corresponding gain value S_GAIN.

FIG. 14 illustrates how an incoming phase angle phi is converted into a corresponding S-GAIN value. The incoming phase phi is represented on the X-axis. The resulting S_GAIN value is represented on the Y-axis. The values of the S-GAIN values output from gain determination block 23 range from approximately twenty percent to approximately negative twenty percent. The function that converts the incoming phase angle phi into an S-GAIN value has the appearance of a stepped sinusoidal wave.

Returning to FIG. 10, the S-GAIN value output from gain determination block 23 is supplied to a chrominance gain block 24. The chrominance gain block 24 receives the intermediate $Cr^I$ chrominance and intermediate $Cb^I$ chrominance values and scales them in accordance with the value of S-GAIN.

FIG. 15 illustrates how an incoming intermediate $Cb^I$ chrominance value is scaled to generate an output second $Cb^2$ chrominance value depending on the value of S_GAIN. Similarly, the figure illustrates how an incoming intermediate $Cr^I$ chrominance value is scaled to generate an output second $Cr^2$ chrominance value depending on the value of S_GAIN. The second chrominance values are designated in the figure with superscript values of two. The second $Cb^2$ and $Cr^2$ chrominance values are output from the chrominance adjust circuit 19 and form two values of a set 25 of color corrected pixel values.

As illustrated in FIG. 10, the phase angle phi is also supplied to the luminance adjust circuit 20. A gain determination block 26 receives the phase angle phi value and converts it into a corresponding gain value B_GAIN.

FIG. 16 illustrates how an incoming phase angle phi is converted into a corresponding B-GAIN value. The incoming phase phi is represented on the X-axis. The resulting B_GAIN value is represented on the Y-axis. The values of the B-GAIN values output from gain determination block 26 range from approximately positive twenty percent to approximately negative twenty percent. The function that converts the incoming phase angle phi into a B-GAIN value has the appearance of a stepped sinusoidal wave.

Returning to FIG. 10, the B-GAIN value output from gain determination block 26 is supplied to a luminance gain block 27. The luminance gain block 27 receives the first Y1 luminance value that is being output by RGB-to-YCbCr conversion circuit 15. Luminance gain block 27 scales the first $Y^1$ luminance value depending on the B-GAIN value.

FIG. 17 illustrates how the first $Y^1$ luminance value is scaled to generate a second $Y^2$ luminance value depending on the value of B-GAIN. The second $Y^2$ luminance value is designated in the figure with a two superscript. The second $Y^2$ luminance value as output from luminance gain block 27 is the $Y^2$ luminance value of the second set 25 of color corrected pixel values.

Although the present invention has been described in connection with certain specific embodiments for instructional purposes, the present invention is not limited thereto. Intermediate $Cb^I$ and $Cr^I$ can be input to the chrominance adjust circuit 19 and/or to the luminance adjust circuit 20 through an additional polarization circuit. In one embodiment, the Bayer-to-RGB conversion circuit 14, the RGB-to-YCbCr conversion circuit 15 and the color correction portion 12 are all disposed on a single digital image processing integrated circuit. Polarization block 16 may output a number other than a phase angle that is nonetheless indicative of a relationship between the first $Cb^1$ chrominance value and the first $Cr^1$ chrominance value. Block 16 may, for example, output a simple ratio of the two first chrominance values. In one embodiment, no block 16 is provided, but rather the two first $Cb^1$ and $Cr^1$ chrominance values are supplied directly to lookup blocks 21, 23 and 26. The lookup blocks 21, 23 and 26 use the two first $Cb^1$ and $Cr^1$ chrominance values to lookup a phase difference value, an S_GAIN value, and a B_GAIN value, respectively. The chrominance scaling and color phase rotation operations can be performed in either order. Although lookup table (LUT) memories are described above as implementations of blocks 21, 23 and 26, other circuitry for converting one number into another number other than LUT memories can be used. For example, portions of arithmetic logic can perform simple arithmetic operations in order to generate the desired phase difference value, S_GAIN value, and B_GAIN value. In one embodiment, an integrated circuit embodying the color correction circuitry described above has an interface for receiving image data from one or more image sensors that do not output Bayer format data, but rather output image data in RGB format or in another color space format. The interface on the integrated circuit is configurable to receive image data from a selectable one of these different image sensors.

In one embodiment, a user of a digital camera can select one of a plurality of light condition settings. Alternatively, the camera can put itself into one of the light condition settings. For each different light condition setting, the function of phase angle implemented by block 21 is different. A different lookup table memory may, for example, be consulted depending on the light condition setting. A single SRAM (static random access memory) lookup table memory may be loaded with different data depending on the light condition setting such that a single lookup table memory can be used for block 21. Also, the function of phase angle implemented by blocks 23 and/or 26 can also be made to be different depending on the light condition setting of the camera. There may, for example, be three or more such light condition settings. The spectrum characteristics of a sensor (CCD or CMOS) may vary depending on the manufacturer of the sensor. In one advantageous aspect, the SRAM lookup table memories are loaded with different data depending on the type of sensor used (for example, CCD or CMOS) in order to compensate for differences between these types of sensors so that any one of multiple different sensors can be used in conjunction with the same type of color correction integrated circuit in a digital camera. Accordingly, various modifications, adaptations, and combinations of various features of the described embodiments can be practiced without departing from the scope of the invention as set forth in the claims.

What is claimed is:

1. An integrated circuit that processes a first set of YCbCr pixel values, the first set comprising a first Y luminance value, a first Cb chrominance value, and a first Cr chrominance value, the integrated circuit generating a second set of YCbCr pixel values, the second set comprising a second Y lumuninance value, a second Cb chrominance value, and a second Cr chrominance value, the integrated circuit comprising:

a color phase adjust circuit that receives the first Cb chrominance value and the first Cr chrominance value and that performs color phase rotation based on a relationship between the first Cb chrominance value and the first Cr chrominance value, the color phase adjust circuit outputting an intermediate Cb chrominance value and an intermediate Cr chrominance value;

a chrominance adjust circuit that receives the intermediate Cb chrominance value and the intermediate Cr chrominance value and that performs scaling based on the relationship between the first Cb chrominance value and the first Cr chrominance value, the chrominance adjust circuit outputting the second Cb chrominance value and the second Cr chrominance value;

a luminance adjust circuit that receives the first Y luminance value and that performs scaling based on the relationship between the first Cb chrominance value and the first Cr chrominance value, the luminance adjust circuit outputting the second Y luminance value; and a circuit that receives the first Cb chrominance value and the first Cr chrominance value and that outputs a number indicative of the relationship between the first Cb chrominance value and the first Cr chrominance value, wherein the circuit supplies the number to the color phase adjust circuit, the chrominance adjust circuit and the luminance adjust circuit.

2. The integrated circuit of claim 1, wherein the color phase adjust circuit comprises:
 a portion that converts the number into a phase difference value; and
 a portion that uses the phase difference value to convert the first Cb chrominance value and the first Cr chrominance value into the intermediate Cb chrominance value and the intermediate Cr chrominance value.

3. The integrated circuit of claim 2, wherein the portion that converts the number into the phase difference value comprises a lookup-table memory.

4. The integrated circuit of claim 1, further comprising:
 an RGB-to-YCbCr conversion circuit that receives a set of RGB pixel values and that outputs the first set of YCbCr pixel values.

5. The integrated circuit of claim 4, further comprising:
 a Bayer-to-RGB conversion circuit that receives Bayer values and outputs the set of RGB pixel values.

6. The integrated circuit of claim 5, wherein the integrated circuit is part of an image capture device, the image capture device comprising an image sensor, the image sensor outputting the Bayer values.

7. The integrated circuit of claim 6, wherein the image sensor comprises an analog front end/timing generator (AFE/TG) device and one of a charge coupled sensor (CCD) device and a CMOS sensor device.

8. The integrated circuit of claim 1, wherein the chrominance adjust circuit comprises:
 a portion that converts the number into a gain value; and
 a portion that uses the gain value to scale the intermediate Cb chrominance value into the second Cb chrominance value and to scale the intermediate Cr chrominance value into the second Cr chrominance value.

9. The integrated circuit of claim 8, wherein the portion that converts the number into the gain value comprises a lookup-table memory.

10. The integrated circuit of claim 1, wherein the relationship between the first Cb chrominance value and the first Cr chrominance value is a phase angle.

11. The integrated circuit of claim 1, wherein the relationship between the first Cb chrominance value and the first Cr chrominance value is a ratio of the first Cb chrominance value to the first Cr chrominance value.

12. The integrated circuit of claim 1, wherein the integrated circuit is part of an image capture device, the image capture device comprising an image sensor, the image sensor outputting image data that is converted into the first set of YCbCr pixel values.

13. A method, comprising:
 (a) using an image sensor to capture an image and to output image data, wherein the image sensor is part of an image capture device, the image capture device being taken from the group consisting of: a digital camera, a mobile communication device that includes a digital camera functionality;
 (b) converting the image data into a set of YCbCr image pixel values, the set of YCbCr image pixel values including a first Y luminance value, a first Cb chrominance value and a first Cr chrominance value;
 (c) using a color correction circuit to determine a phase angle based on the first Cb chrominance value and the first Cr chrominance value, wherein the color correction circuit is part of the image capture device;
 (d) using the color correction circuit to control a color adjust rotation operation based on the phase angle, the color phase adjust operation converting the first Cb chrominance value and the first Cr chrominance value into an intermediate Cb chrominance value and an intermediate Cr chrominance value;
 (e) using the color correction circuit to control a chrominance adjust operation based on the phase angle, the chrominance adjust operation converting the intermediate Cb chrominance value and the intermediate Cr chrominance value into second Cb chrominance value and a second Cr chrominance value; and
 (f) using the color correction circuit to control a luminance adjust operation based on the phase angle, the luminance adjust operation converting a luminance value of the first Y luminance value into a second Y luminance value.

14. The method of claim 13, wherein the image capture device is operable in one of at least three light condition settings, wherein when the image capture device is in a first of the light condition settings then the phase angle is used in (d) in a first manner to control the color phase adjust operation, wherein when the image capture device is in a second of the light condition settings then the phase angle is used in (d) in a second manner to control the color phase adjust operation, and wherein when the image capture device is in a third of the light condition settings then the phase angle is used in (d) in a third manner to control the color phase adjust operation.

15. The method of claim 13, wherein the color adjust rotation operation comprises the steps of:
 converting the phase angle into a phase difference; and
 using the phase difference to adjust a color phase of the first Cb chrominance value and the first Cr chrominance value, the intermediate Cb chrominance value and the intermediate Cr chrominance value being a result of the color phase adjustment.

16. The method of claim 15, wherein the converting of the phase angle into a phase difference involves using the phase angle to look up the phase difference in a lookup table memory.

17. An image capture device, comprising:
 a sensor portion that captures an image and outputs corresponding pixel information; and
 means for receiving the pixel information from the sensor portion and for performing color correction on the pixel information by determining a color phase of the pixel information, and then by using the color phase to control a color phase rotation operation that converts the pixel information received from the sensor portion into phase rotated pixel information, wherein the color correction also involves using the color phase to control a chrominance gain operation, the chrominance gain operation converting the phase rotated pixel information into color corrected pixel information, wherein the color correction also involves using the color phase to control a luminance gain operation, the luminance gain operation converting a luminance value of the pixel information received by the means into a luminance value of the color corrected pixel information.

18. The circuit of claim 17, wherein the sensor portion comprises an image sensor that outputs Bayer data, and wherein the pixel information received by the means is YCbCr pixel information.

* * * * *

UNITED STATES PATENT AND TRADEMARK OFFICE
CERTIFICATE OF CORRECTION

PATENT NO. : 7,643,681 B2
APPLICATION NO. : 11/326252
DATED : January 5, 2010
INVENTOR(S) : Nakasone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Sixteenth Day of November, 2010

David J. Kappos
*Director of the United States Patent and Trademark Office*